United States Patent [19]

Khachaturian et al.

[11] Patent Number: 5,429,007
[45] Date of Patent: Jul. 4, 1995

[54] TENSION LOAD CELL APPARATUS

[76] Inventors: Jon E. Khachaturian, 5827 Rhodes Ave.; William B. Thrift, 3701 Herald St., both of New Orleans, La. 70131

[21] Appl. No.: 36,184

[22] Filed: Mar. 23, 1993

[51] Int. Cl.[6] ................................................ G01L 1/22
[52] U.S. Cl. ...................... 73/862.474; 73/862.56; 73/862.392
[58] Field of Search ............ 73/862.391–862.393, 73/862.471, 862.473, 862.474, 862.56, 862.57, 862.627, 862.635, 796

[56] References Cited

U.S. PATENT DOCUMENTS

| | | | |
|---|---|---|---|
| 2,259,217 | 10/1941 | Stevenson | 59/86 |
| 2,259,880 | 10/1941 | Ehmann | 59/86 |
| 2,709,616 | 5/1985 | Larson et al. | 294/82.1 |
| 3,153,974 | 10/1964 | Canning | 73/796 X |
| 3,290,931 | 12/1966 | Fowkes et al. | 73/862.56 |
| 3,823,395 | 7/1974 | Rigney et al. | 73/862.392 X |
| 3,864,966 | 2/1975 | Seitz | 73/862.627 X |
| 3,911,737 | 10/1975 | Ormond | 73/862.635 X |
| 3,992,934 | 11/1976 | Clark | 73/862.393 X |
| 4,002,540 | 2/1989 | Grabovac et al. | 73/862.632 X |
| 4,059,012 | 11/1977 | Pietzch et al. | 73/862.392 X |
| 4,140,010 | 2/1979 | Kulpmann et al. | 73/862.56 |
| 4,364,279 | 12/1982 | Stern et al. | 73/862.632 X |
| 4,455,880 | 6/1984 | Naslund | 73/862.392 X |
| 4,587,852 | 5/1986 | Butler et al. | 73/862.392 X |
| 4,733,571 | 3/1988 | Ormond | 73/862.632 X |
| 5,114,260 | 5/1992 | Hart et al. | 59/86 X |

OTHER PUBLICATIONS

Yudan Industrial Product Engineering & Sales Brochure on tension load meter.
Metrox Inc. Brochure on tension load links.
Eaton Corp. specifications on rod load cells and fatigue resistant load cells.
Wagner Brochure on load cells.
Stress-Tek Brochure on load cells.
Sensotec Specifications on Rod End In-Line Tension Load Cells.
Sensotec Specifications on Rod End Load Cells with Industrial Threads.
StrainSert Brochure 371-D on Load Sensing Tension Links.
StrainSert Brochure 372-C on Load Sensing Tension Links.

*Primary Examiner*—Richard E. Chilcot, Jr.
*Assistant Examiner*—Elizabeth L. Dougherty
*Attorney, Agent, or Firm*—Pravel, Hewitt, Kimball & Krieger

[57] ABSTRACT

A tension load cell apparatus includes a structural member of metallic construction having a pair of large diameter end portions and a smaller diameter center portion. Strain gauges are carried on the center portion for generating a tension load value responsive to an elongation of the structural member when loaded. Each of the larger diameter portions has a transverse opening that is receptive of a lifting pin such as of a shackle. A casing covers the center portion but is attached only to the upper end portion so that load is not transferred to the casing during use. An indicator groove is provided on the bottom cylindrical portion of the structural member for indicating with a color for example when the load indicator structural member has stretched beyond its permissible limits. A method of the present invention involves the construction of a tension load cell having a pair of spaced apart lifting shackles and transverse shackle pins. As part of the method, the standard shackle pin is replaced with a smaller diameter, high strength pin for carrying greater load in a smaller space thus enabling the use of a cylindrical structural member. Each shackle pin is interfaced with a bushing that is positioned around the pin and inside the shackle openings where the pin interfaces with the shackle which electrically isolates the apparatus from the rigging.

10 Claims, 3 Drawing Sheets

TENSION LOAD CELL APPARATUS

BACKGROUND OF THE INVENTION

1. Field Of The Invention

The present invention relates to load cell devices for use with lifting equipment such as cranes and more particularly relates to a tension load cell apparatus that can be used with a pair of spaced apart lifting shackles that are attached respectively to the ends of the load cell and wherein the shackles are modified according to the method of the present invention using insulating bushings and higher load capacity shackle pins. A smaller load cell is provided, in comparison to similar load cells that can be easily transported by a single worker.

2. General Background

Previous load cell designs have relied primarily on two less desirable approaches. One method involves milling padeyes on the ends of an oversized tension member. This results in a high cost machining operation and excessive weight which is often difficult or impossible to manage without a forklift or like motorized lifting device. This approach does not provide a simple surface configuration to mount a protective casing over the strain gages. Another method in common use is to forego fitting a tension load cell to standard shackles, and rely upon various adapters to connect the load cell to the shackle. Often these adapters are threaded assemblies introducing a source of possible failure, which do not inspire confidence in the end user.

Interference from static electricity can build up on the crane boom during a lift. This is the single most important source of erratic or uncertain load readings when using strain gaged load cells in rigging. The crane boom essentially behaves as a giant antenna, picking up electrical noise from generators, arc welders, motors, storm clouds, and rain. This "noise" corrupts the accuracy and repeatability of the load reading.

Taking weights in a construction yard and load testing crane booms seldom require accuracy greater than ±1%. However, most commercial load cell manufacturers (not being directly involved in the lifting industry) are convinced that 0.25% or 0.1% or better accuracy is essential in load cell design. Therefore, price schedules usually reflect this philosophy. The manufacturing cost involved in producing greater precision load cells increases exponentially not linearly. For example, to produce a cell with a fundamental accuracy/linearity/repeatability of about 0.5% may be one tenth the cost of the same cell specified to 0.1%.

A strain gage installation must be protected from the elements. Common prior art designs weld a casing around the installation. This method distorts the strain in the tension member, not only because of the weld, but also because of the reinforcing effect of the casing. This does not allow the structural member to behave in pure tension due to applied load.

Most commercial load cell manufacturers are fond of touting their welded casings as a hermetic seal. Hermetic seals may find limited application in severe environmental duty (corrosive chemical immersion, deep sea etc.) but have little real need in the general purpose lifting industry.

SUMMARY OF THE PRESENT INVENTION

The Load Cell System of the present invention provides a tension load cell apparatus used for the weighing of heavy objects and the measurement of tensile loads. The apparatus includes a structural member of metallic construction that has a pair of larger diameter end portions, each cylindrically shaped and a cylindrically shaped smaller diameter center portion. A plurality of strain gauges are carried by the center portion of the structural member for generating a tension load value responsive to an elongation of the structural member when it is loaded. Each of the larger diameter cylindrically shaped end portions provides a transverse opening that is receptive of a lifting pin, preferably a shackle pin of a shackle that can be attached to a lifting hook supported by a crane and to load lines attached to an object to be lifted. A casing covers the center section, the casing being attached at one end portion only to the casing, the other end portion of the casing being unconnected to the structural member so that the structural member can elongate independently of the casing.

The apparatus is designed for rugged industrial applications such as chemical plants and fabrication yards where the system would typically be inserted as a component of the rigging suspended from a crane.

As the crane lifts an object the apparatus generates an output signal proportional to the load which is read out in short tons, for example, by an operator using a portable read out device. The operator then knows the weight of the object or the tension in the rigging as appropriate to the situation.

The apparatus of the present invention incorporates a visual signal to warn the user in the event the apparatus has been overloaded past the material yield point, and rendered unsafe to use. This is accomplished by designing the structural element of the tension cell with the weakest point placed at the center of the structural element. As the tension cell is yielded this center area elongates and begins to pull through the bottom of the cover or casing surrounding the load bearing structural element. This action will expose an etched fluorescent safety warning band which had been hidden under the cover piece before loading. The user sees the safety warning band and removes the system from service. The safety warning band is permanently exposed and cannot be removed.

The apparatus of the present invention addresses another problem which plagues the current state of the art in industrial tension load cell systems. A crane's boom acts as a giant antenna which picks up electrical noise from many sources such as arc welders, motors, generators, storm clouds, and general static electricity in the air. This electrical "noise" is passed directly into the electrical components of the tension load cell system and shows up on the operator's load display as erratic and uncertain readings. The apparatus of the present invention has reduced this problem by an order of magnitude through the use of high strength insulating bushings placed around shackle pins. These bushings electrically isolate the load cell structural member from the crane and it's rigging. The result is a more stable readout.

The apparatus of the present invention fits standard shackle bows that are common in the lifting industry. The apparatus uses special high strength pins and high strength insulating bushings in combination.

The physical dimension of the apparatus of the present invention is small so that an "ideal" tension element (i.e. a round bar in pure tension) may be used as the structural element of the system. The axial strain field in this bar, being proportional to the tension in the bar, is measured using electronic strain gages in a circuit configuration similar to a Wheatstone bridge circuit.

The apparatus utilizes a casing that covers the strain gage installation, which is fastened with pins to only one end portion of the structural element. A usual industry practice is to weld a cover at both ends of the structural element. This results in a reinforcing effect of the cover upon the tension element which distorts the purity of the strain field to be measured. The apparatus of the present invention cannot reinforce the tension element, because the cover is free to slide at the other end. The strain field remains substantially ideal. The cover is then sealed against rain and washdown by the use of o-rings placed at each end of the cover between the cover and the tension element.

The apparatus insures that the flow of the strain field from the tension cell eyes down through the strain measurement column remains smooth, parallel, and free of discontinuities which degrade the accuracy, repeatability, and linearity of the strain measurement. This is accomplished by providing a large radius fillet to gently blend together the eye section with the strain measurement column.

Drilled holes for dowel pin fasteners, grooves for o-rings, and safety warning bands are not permitted to be deep enough to enter into the critical diameter of the strain measurement column. This insures that strain field discontinuities are not introduced into the measurement column.

The apparatus incorporates a large three-to-one ratio of measurement column length to width which insures that the flow of the strain field has had sufficient distance to become fully parallel and uniform prior to the actual precise point where the strain measurement is taken. This ratio has been shown to be effective in terms of producing an accurate, repeatable, linear tension load cell while still being small enough to keep the overall physical dimensions of the system small and lightweight.

The apparatus measures the strain in the tension element using a configuration of the Wheatstone bridge. A usual industry practice has been the use of electronic strain gages configured in a four arm bridge circuit to measure the strain and from that strain measurement determine the load or weight which produced said strain. Generally two arms of the bridge measure the axial strain while the other two arms measure the strain produced by the material's undesirable but inherent Poisson effect. The apparatus of the present invention continues to follow this procedure but diverges from other designs in the number of strain gages incorporated in each arm of the bridge. Other designs typically place an identical number of strain gages in each bridge arm. The apparatus of the present invention uses four strain gages in each bridge arm measuring uniaxial strain. The gages are equally distributed every forty-five degrees around the measurement column. Only a single strain gage is used in the two arms measuring the Poisson strain. This reduces the non-linearity produced by the Poisson effect by the amount that would have appeared through the action of six additional strain gages, (total four in each arm), which are no longer being used in the circuit. By using a total of eight strain gages equally spaced around the circumference of the measurement column, the apparatus of the present invention is insensitive to the effects of off axis loading.

The apparatus of the present invention is specially polished at the strain measurement column in a manner which eliminates undesirable skin effects in the material of the tension element. This results in repeatable strain measurements and long term stability in the quality of the strain gage installation. Surfaces upon which strain gages are to be installed are polished to provide efficient transfer of strain from the tension element into the strain gage itself. If the strain transfer is not optimum, the quality of the resulting strain measurement is degraded.

The apparatus of the present invention includes an electrical connector that is protected from mechanical damage by mounting it in a vertical configuration that is less susceptible to impact from a lateral blow. A guard tab covers the electrical connector to virtually eliminate the chance of damage from being impacted by heavy wire ropes, shackles, and other rigging equipment during service.

BRIEF DESCRIPTION OF THE DRAWINGS:

For a further understanding of the nature and objects of the present invention, reference should be had to the following detailed description taken in conjunction with the accompanying drawings, in which like parts are given like reference numerals, and wherein.

DETAILED DESCRIPTION OF THE PREFERRED EMBODIMENT

Figure 1:
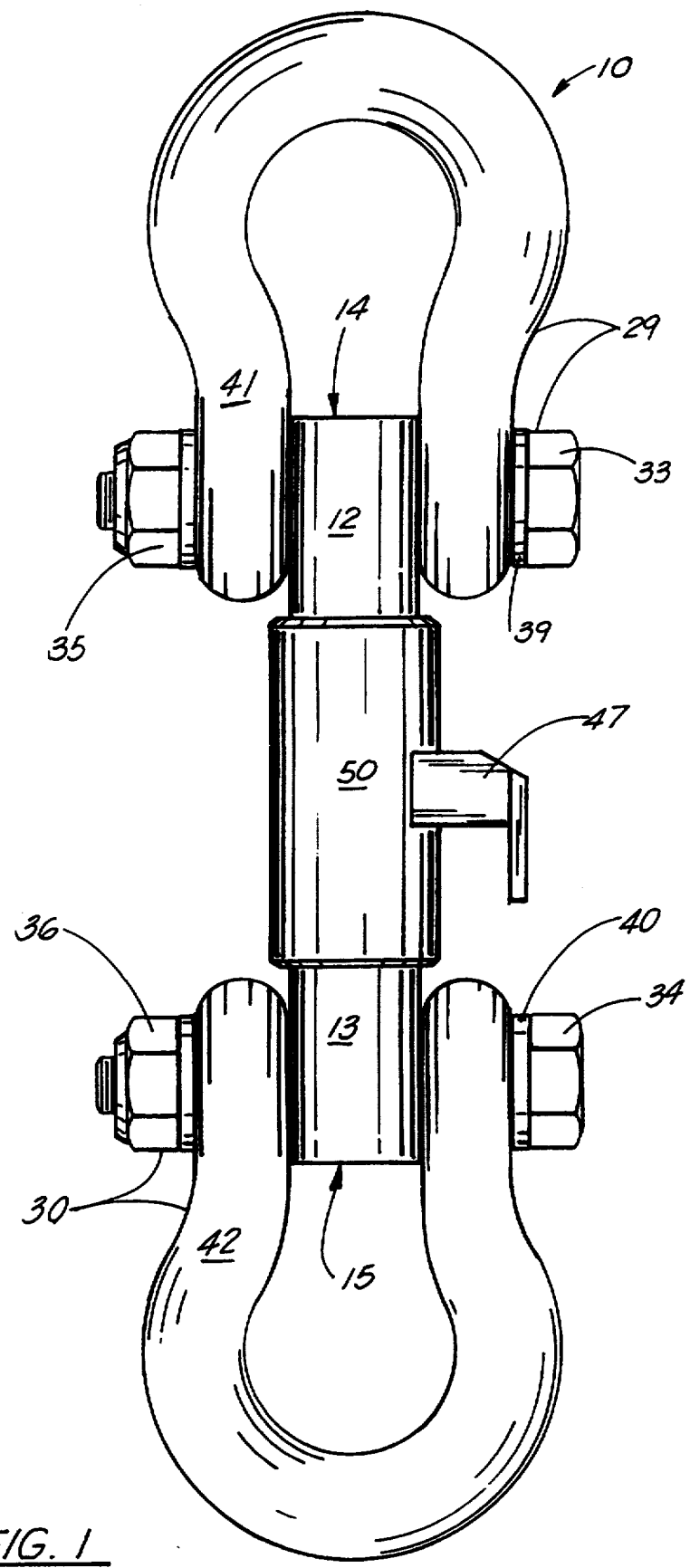
FIG. 1 is a front elevational view of the preferred embodiment of the apparatus of the present invention.
Figures 2, 3:
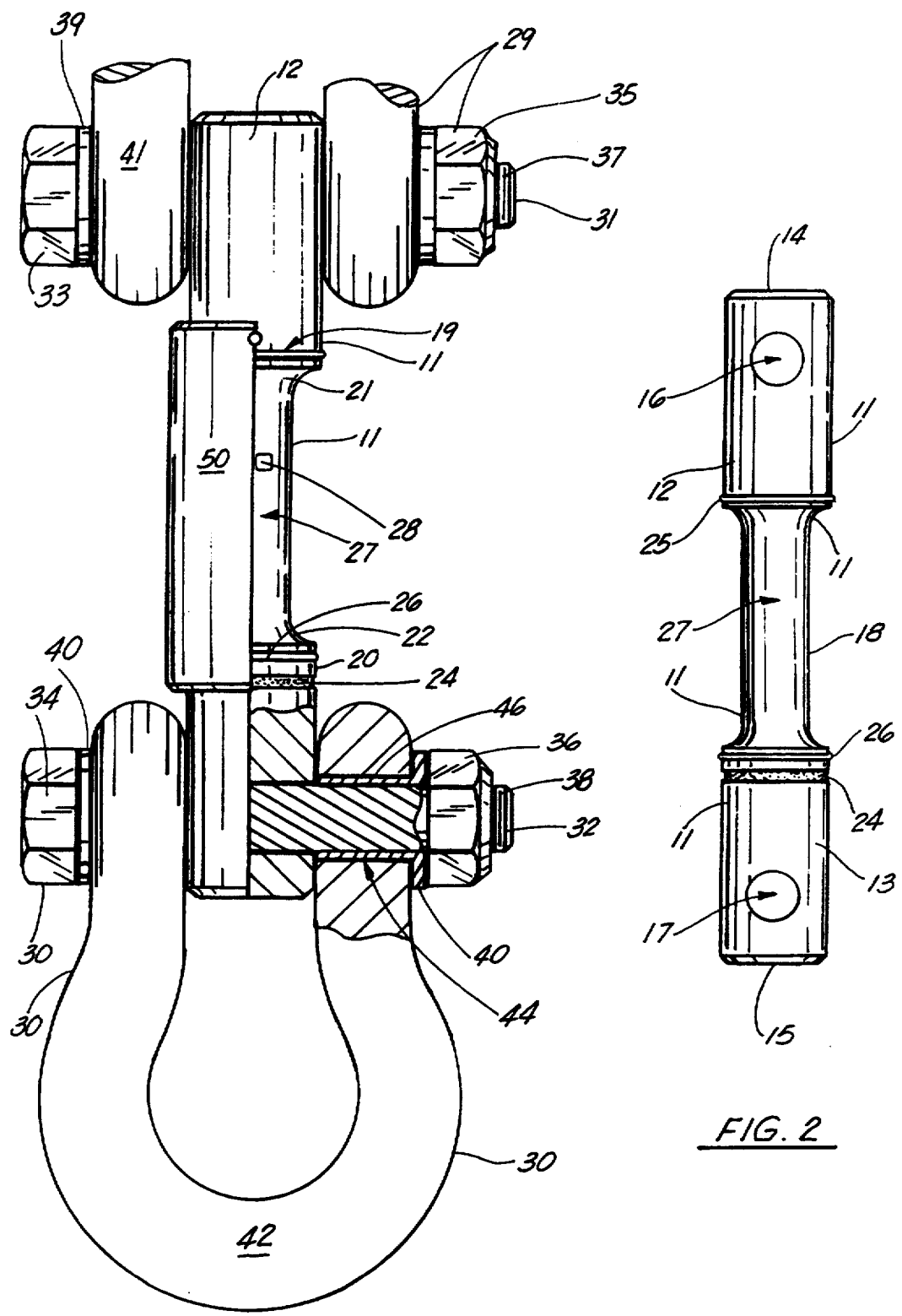
FIG. 2 is a front elevational view of the structural member portion of the preferred embodiment of the apparatus of the present invention.
FIG. 3 is a front elevational partially cut away view of the connector block and casing portion of the preferred embodiment of the apparatus of the present invention.

FIGS. 1-3 show the preferred embodiment of the apparatus of the present invention designated generally by the numeral 10. Tension load cell apparatus 10 includes a structural member 11 having a first cylindrical end portion 12 at its upper end and a second lower cylindrical end portion 13. The end portions of structural member 11 are flat, providing a flat top 14 and a flat bottom end portion 15.

A pair of spaced apart transverse bores 16, 17 are provided through structural member 11 at cylindrical end portions 12, 13 respectively. The transverse bores 16, 17 provide openings on structural member 11 for attaching shackles 29, 30 to the structural member 11 at the shackle pins 31, 32.

The center section 18 of structural member 11 carries one or more strain gauges that are coupled to a remote load indicator with a digital readout. During use, the exact weight of a particular item being lifted can be viewed on the screen of the load indicator in tons for example. Strain gauges 28 are installed such as for example every forty-five degrees (45°) around the circumference of the structural member 11. As the structural member 11 is loaded, a proportional voltage output is produced which is picked up by the load indicator and converted to engineering unit such as short tons for a direct display of load.

Each cylindrical end portion 12, 13 carries an annular groove 19, 20 adjacent annular shoulders 21, 22 respectively of structural member 11, as shown in FIG. 2. O-rings 25, 26 are placed in the annular grooves 19, 20 respectively for forming a seal between the structural member 11 and casing 50.

Figures 4, 5, 6:
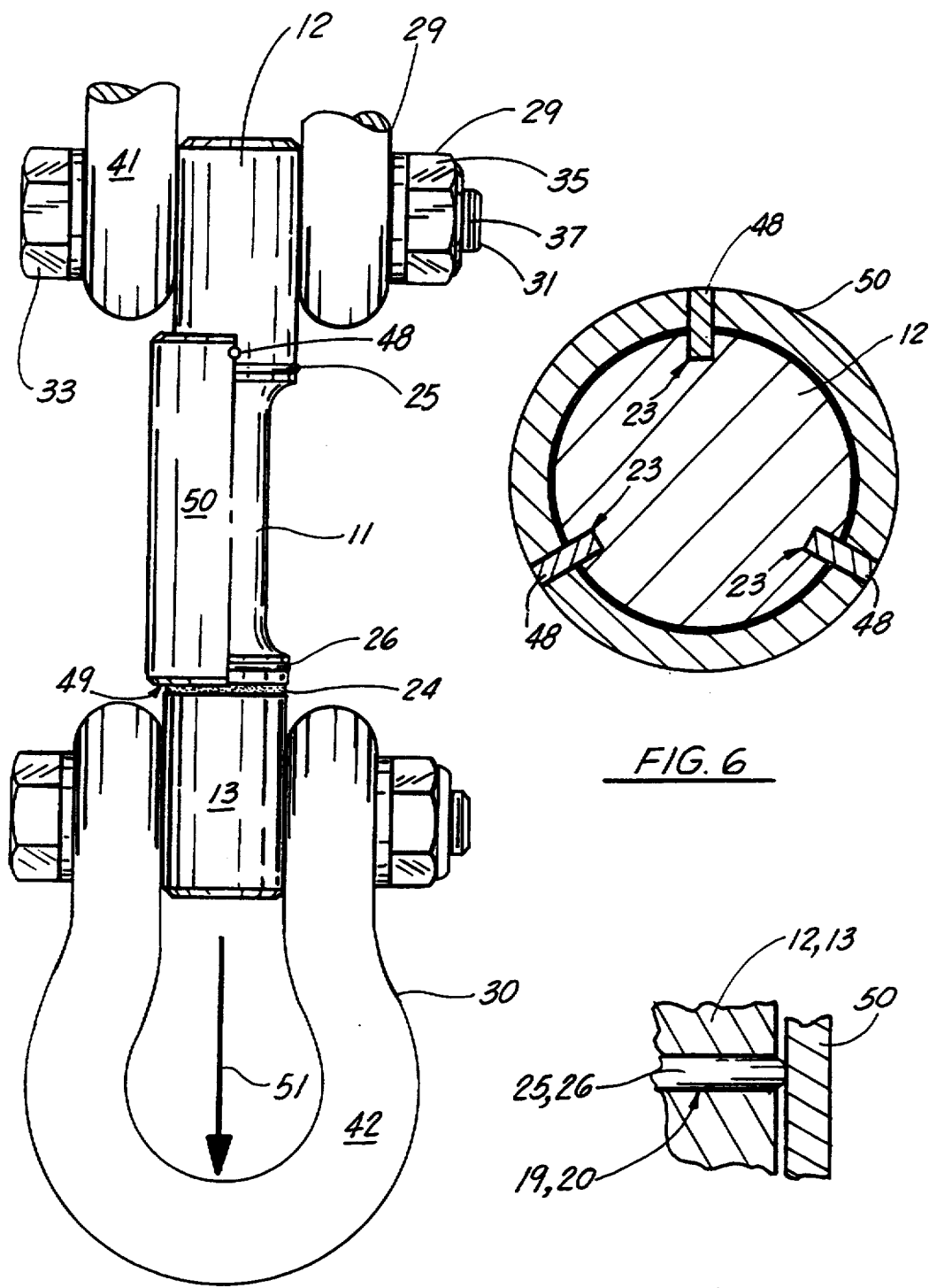
FIG. 4 is an elevational view of the preferred embodiment of the apparatus of the present invention shown in an over-stressed condition.
FIG. 5 is a fragmentary view of the preferred embodiment of the apparatus of the present invention.
FIG. 6 is a fragmentary transverse sectional view of the preferred embodiment of the apparatus of the present invention.

The annular shoulders 21, 22 define transition areas for interfacing the smaller diameter center section 18 of structural member 11 and the larger diameter cylindrical end portions 12, 13. The smaller diameter center section 18 provides a strain gauge surface area 27 for placement of a plurality of strain gauges 28 thereon. A shallow groove 24 can be painted a bright color because it functions as an indication that the load cell 10 has been over-stressed and structural element 11 stretched excessively (see FIG. 4). The groove 24 shows below underside 49 of casing 50 in the over-stressed condition when cell 10 is loaded in the direction of arrow 51 (i.e. tension).

Each shackle 29, 30 is modified by exchanging the oem shackle pin with a shackle pin 31, 32 of higher strength metal. This allows the shackle pins 31, 32 to be of a smaller diameter so that shackles 29, 30 can be of a smaller size which allows an individual worker to carry the entire assembly of the load cell 10 and the shackles 29, 30. The shackle pins 31, 32 each provide hexagonal heads 33, 34 and are assembled to the shackle using a separate nut 35, 36 as shown in FIG. 1. Each of the pins 31, 32 provides a threaded end portion 37, 38 for threadably engaging a nut 35, 36.

A pair of spaced apart bushings 39 are provided for interfacing shackle pin 31 and shackle 29 at the upper end of load cell 10. Similarly, bushings 40 are positioned as an interface between shackle 30 and pin 32 at the lower end of load cell 10.

Each of the bushings 39, 40 provides a transverse opening 45, 46 for receiving the respective pin 31, 32. Each of the shackles 29, 30 provides a U-shaped portion 41, 42 that engages a lifting hook during use, such as a crane hook or the like.

Casing 50 protectively houses the center portion 18 of structural member 11 and the strain gauges 28 contained thereon. Terminal block cover 47 forms a protective cover over a terminal (not shown) that allows an electrical connection to be made between the strain gauges 28 and a load indicator. An electrical cable (not shown) extends between the terminal block cover 47 and a load indicator (not shown). The cable can extend several feet to a remote location where an operator holds a portable load indicator instrument. A suitable, commercially available load indicator instrument is a model NK portable indicator manufactured by Sensotec, as an example.

The following table lists the part numbers and part descriptions as used herein and in the drawings attached hereto.

| Part Number | Description |
| --- | --- |
| 10 | tension load cell apparatus |
| 11 | structural member |
| 12 | cylindrical end portion |
| 13 | cylindrical end portion |
| 14 | flat top |
| 15 | flat bottom end |
| 16 | transverse bore |
| 17 | transverse bore |
| 18 | center section |
| 19 | annular groove |
| 20 | annular groove |
| 21 | annular shoulder |
| 22 | annular shoulder |
| 23 | opening |
| 24 | shallow groove |
| 25 | o-ring |
| 26 | o-ring |
| 27 | strain gauge surface area |
| 28 | strain gauge |
| 29 | shackle |
| 30 | shackle |
| 31 | pin |
| 32 | pin |
| 33 | head |
| 34 | head |
| 35 | nut |
| 36 | nut |
| 37 | threaded end |
| 38 | threaded end |
| 39 | bushing, upper |
| 40 | bushing lower |
| 41 | bow |
| 42 | bow |
| 43 | transverse opening |
| 44 | transverse opening |
| 45 | bushing bore |
| 46 | bushing bore |
| 47 | terminal |
| 48 | pin |
| 49 | underside |
| 50 | casing |
| 51 | load arrow |

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A load cell apparatus comprising:
   a) a structural member of metallic construction having a pair of larger diameter end portions and a smaller diameter center portion;
   b) strain gauge means carried by the center portion of the structural member for generating a tension load value responsive to an elongation of the structural member when loaded;
   c) each larger diameter portion having a transverse opening receiving a lifting pin; and
   d) a casing that covers the center section, the casing being attached at one end portion thereof to an end portion of the structural member, the other end portion of the casing being unconnected to the structural member so that the structural member elongates independently of the casing when the structural member is loaded so that the flow of the strain field from the transverse openings through the center portion remains smooth, parallel and free of substantial discontinuity.

2. The load cell of claim 1 further comprising a pair of shackles, each having a shackle pin, and wherein each lifting pin is a shackle pin.

3. The load cell of claim 2 wherein there is further provided an insulating bushing positioned around each shackle pin and its shackle.

4. The load cell of claim 1 wherein each larger diameter end portion of the structural member is cylindrical in shape.

5. The load cell of claim 4 further comprising a pair of O-ring seal members disposed respectively between each of the larger diameter end portions and the casing.

6. The load cell of claim 1 wherein the casing is generally cylindrically shaped.

7. The load cell of claim 1 wherein the larger diameter end portions include upper and lower cylindrical sections, and the casing is connected to the upper cylindrical section.

8. The load cell of claim 1 wherein the smaller diameter center portion is generally cylindrically shaped.

9. The load cell of claim 1 wherein the center section is highly polished.

10. The load cell of claim 1 wherein the casing is attached to one of the larger diameter end portions of the structural member, and the other larger end portion of the structural member carries an indicator that is hidden beneath the casing until an over stressed condition of the load cell is reached, the indicator being visible externally of the casing when said load cell is over stressed.

* * * * *